3,144,491
PREPARATION OF 1 - (2 - BICYCLO[2·2·1]HEPT-5-ENYL)HEX-5-ENE AND 1-[2 - ($\Delta^6$ - OCTAHYDRO-1,4:5,8-DIMETHANONAPHTHYL)]HEX-5-ENE
George L. O'Connor, Henry E. Fritz, and David W. Peck, Charleston, W. Va., assignors to Union Carbide Corporation, a corporation of New York
No Drawing. Filed Dec. 28, 1962, Ser. No. 247,833
2 Claims. (Cl. 260—666)

This application relates to the preparation of 1-(2-bicyclo[2·2·1]hept-5-enyl)hex-5-ene and 1-[2-($\Delta^6$-octahydro-1,4:5,8-dimethanonaphthyl)]hex-5-ene by the reaction of cyclopentadiene with 1,7-octadiene.

The preparation of 1-(2-bicyclo[2·2·1]hept-5-enyl)-hex-5-ene and 1 - [2 - ($\Delta^6$ - octahydro - 1,4:5,8 - dimethanonaphthyl)]hex-5-ene can be illustrated by the following equations:

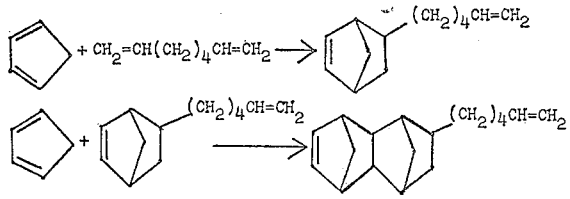

Either cyclopentadiene or dicyclopentadiene can be reacted with 1,7-octadiene to produce 1-(2-bicyclo[2·2·1]-hept-5-enyl)hex-5-ene and 1-[2-($\Delta^6$-octahydro-1,4:5,8-dimenthanonaphthyl)]hex-5-ene. Dicyclopentadiene readily decomposes to cyclopentadiene when heated at about 160° C. or higher. The cyclopentadiene produced then reacts with the 1,7-octadiene as expalined above.

When effecting reaction according to the process of the instant invention, it is preferable to employ a substantial excess of the 1,7-octadiene over the stoichiometric amount required because of the tendency of cyclopentadiene to condense with itself. Amounts of 1,7-octadiene of from about 2 to about 4 times the stoichiometric equivalent are preferred for this purpose, but amounts of from as little as about 0.1 mole to as much as about 20 moles of 1,7-octadiene per mole of cyclopentadiene present can also be employed. When an excess of 1,7-octadiene is employed, the 1,7-octadiene acts as a solvent as well as functioning as a reactant. If desired, an inert liquid solvent can also be employed. Suitable inert liquid solvents which can be employed include hydrocarbons such as hexane, cyclohexane, heptane, benzene, toluene, and the like, ethers such as dioxane, tetrahydrofuran, and the like, and ketones such as acetone and the like. In general, an amount of solvent ranging from about 0.5 to about 20 times, preferably from about 2 to about 4 times, the weight of the reactants present can be effectively employed.

The process of the instant invention can be conducted in either a batchwise or continuous manner at pressures of from about 100 p.s.i.g., or less, to about 10,000 p.s.i.g., or more. When a batch procedure is employed, reaction is usually effected in a closed system under autogenous pressure, usually at a pressure of from about 100 p.s.i.g. to about 500 p.s.i.g. When the process is conducted continuously, the reactants are usually fed through a pressurized reactor at a pressure of from about 500 p.s.i.g. to about 10,000 p.s.i.g., or more, preferably from about 1000 p.s.i.g. to about 4000 p.s.i.g.

The reaction time is not critical, but longer reaction times usually result in greater yields. Reaction times of from about 1 to about 6 or more hours, preferably from about 3 to about 4 hours, are satisfactory for batch operations. When the reaction is conducted continuously, the rate of flow of the reactants through the reactor is preferably regulated so that from about 2 to about 30, most preferably from about 10 to about 20, liters of reaction mixture per liter of reactor volume pass through the system each hour. The ratio of the liters of reaction mixture to liter of reactor volume passing through the system in one hour is known as the liquid hourly space velocity.

Reaction according to the process of the instant invention readily occurs at temperatures ranging from about 150° C., or less, to about 350° C., or higher. When the reaction is conducted in a batchwise manner, a temperature of from about 200° C. to about 250° C. is preferred. When the reaction is conducted continuously, a temperature of from about 250° C. to about 300° C. is preferred.

The 1-(2-bicyclo[2·2·1]hept-5-enyl)hex-5-ene and 1-[2 - ($\Delta^6$ - octahydro - 1,4:5,8 - dimethanonaphthyl)]hex-5-ene produced by the process of the instant invention can be recovered from the reaction mixture by conventional techniques, such as by distillation. These products can be epoxidized and polymerized, as is obvious to one skilled in the art. Polymerization takes place in the presence of from about 0.01 to about 5 percent by weight of a free radical producing initiator. When these products are epoxidized, both monoepoxy and diepoxy derivatives can be produced. Epoxidation can be effected by means of peracids such as peracetic acid, perbenzoic acid, monoperphthalic acid, performic acid and the like, at temperatures of from about —25° C. to about 150° C., preferably from about 10° C. to about 90° C.

The epoxy derivatives can be polymerized and cured by the reaction of said monomers alone or with appropriate hardeners such as polycarboxylic acid compounds, polycarboxylic acid anhydrides, polyols, polyfunctional amines, and combinations thereof. Typical catalysts which can be added, if desired, to accelerate the curing are base and acid catalysts, particularly acid catalysts of the Lewis acid type. Typical Lewis acid type catalysts include boron trifluoride, stannic chloride, zinc chloride, aluminum chloride, ferric chloride and the like. Complexes of the various Lewis acids, such as etherates, and aminates of boron trifluoride are also effective. Other acid catalysts which can be employed include sulfuric acid, phosphoric acid, perchloric acid, polyphosphoric acid, and various sulfonic acids, such as para-toluenesulfonic acid and benzenesulfonic acid. Typical bases include the alkali metal hydroxides, e.g., sodium hydroxide and potassium hydroxide, and quaternary ammonium compounds, e.g., benzyltrimethylammonium hydroxide, tetramethylammonium hydroxide and the like. Catalysts in amounts ranging up to 5.0 weight percent, based on the weight of the epoxide, can be added at any time prior to curing, or not at all, as desired. Higher catalyst concentrations above this range are also effective, although concentrations of 5.0 weight percent and below have been found to be adequate.

Curing can be effected at temperatures from about 25° C. to 250° C. Temperatures higher than 250° C. can also be used, although some discoloration, which may not be desired in the final product, may result. The time for effecting a complete cure can be varied from several minutes to several hours.

The curable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in these compositions so as to impart special properties to articles manufactured therefrom. Such sundry articles as buttons, combs, brush handles, structural parts for instrument cabinets and the like can be formed through the use of these curable compositions.

The following examples are set forth for purposes of illustration so that those skilled in the art may better understand this invention, and it should be understood that they are not to be construed as limiting this invention in any manner.

*Example 1*

To a three-liter stainless steel rocking autoclave were charged 164 grams of dicyclopentadiene (1.25 moles), 110 grams of 1,7-octadiene (1.0 mole), and 500 milliliters of cyclohexane. The autoclave was sealed and heated at a temperature of 226±2° C. for four hours. At the end of this time, the autoclave was cooled, and a 657 gram portion of the reaction mixture was fractionally distilled. About 33 grams (0.19 mole) of 1-(2-bicyclo[2·2·1]hept-5-enyl)hex-5-ene and 31 grams (0.13 mole) of 1-[2-($\Delta^6$-octahydro - 1,4:5,8 - dimethanonaphthyl)]hex - 5 - ene were collected, together with 55 grams of unreacted 1,7-octadiene and 25 grams of unreacted dicyclopentadiene. The yield of 1-(2-bicyclo[2·2·1]hept-5-enyl)hex-5-ene, based on 1,7-octadiene, was 19 percent. The yield of 1 - [2 - ($\Delta^6$ - octahydro - 1,4:5,8 - dimethanonaphthyl)]-hex-5-ene, based on 1,7-octadiene, was 13 percent.

Redistilled 1 - (2 - bicyclo[2·2·1]hept - 5 - enyl)hex-5-ene had a boiling point of 88° C. at 5 mm. Hg pressure, an index of refraction of 1.4770 at 20° C., a density of 0.880 at 20° C., and a molecular weight of 173 (calculated 176), as determined by the freezing point depression of benzene. The infrared spectrum of this product was consistent with the proposed structure.

*Analysis.*—Calculated for $C_{13}H_{20}$: C, 88.6%; H, 11.4%. Found: C, 88.5%; H, 11.5%.

Redistilled 1 - [2 - ($\Delta^6$ - octahydro - 1,4:5,8 - dimethanonaphthyl)]hex-5-ene had a boiling point of 97° C. at 0.1 mm. Hg pressure, an index of refraction of 1.5100 at 20° C., and a density of 0.945 at 20° C. The infrared spectrum of this product was consistent with the proposed structure.

*Analysis.*—Calculated for $C_{18}H_{26}$: C, 89.2%; H, 10.8%. Found: C, 89.4%; H, 10.8%.

*Example 2*

A solution of 324 grams (2.95 moles) of 1,7-octadiene and 776 grams (5.88 moles) of dicyclopentadiene in 2942 grams of toluene was continuously passed through a 60 cc. tubular reactor about 11 feet long and 3/16 inch in inside diameter at a liquid hourly space velocity of 6.2. The reactor was maintained at a temperature of 290° C. and a pressure of 4,000 p.s.i. The mole ratio of available cyclopentadiene to 1,7-octadiene was 4:1.

About 3,814 grams of liquid reaction product were recovered. The reaction product was distilled and 130 grams (0.74 mole) of 1-(2-bicyclo[2·2·1]hept-5-enyl)-hex-5-ene and 30 grams (0.124 mole) of 1-[2-($\Delta^6$-octahydro-1,4:5,8-dimethanonaphthyl)]hex-5-ene were collected. The yield of 1-(2-bicyclo[2·2·1]hept-5-enyl)hex-5-ene, based on 1,7-octadiene, was 25 percent. The yield of 1-[2 - ($\Delta^6$ - octahydro - 1,4:5,8 - dimethanonaphthyl)]hex-5-ene, based on 1,7-octadiene, was 4 percent.

*Example 3*

The procedure of Example 2 was repeated employing a mole ratio of available cyclopentadiene to 1,7-octadiene of 2:1. A yield of 1-(2-bicyclo[2·2·1]hept-5-enyl)hex-5-ene of 33 percent and a yield of 1-[2-($\Delta^2$-octahydro-1,4:5,8-dimethanonaphthyl)]hex-5-ene of 7 percent, based on 1,7-octadiene, were obtained.

*Example 4*

The procedure of Example 3 was repeated at a temperature of 250° C., a pressure of 500 p.s.i., and a liquid hourly space velocity of 2.1. A yield of 1-(2-bicyclo-[2·2·1]hept-5-enyl)hex-5-ene of 37 percent, based on 1,7-octadiene, was obtained.

*Example 5*

The procedure of Example 2 was repeated at a liquid hourly space velocity of 6.0 employing a mole ratio of 1,7-octadiene to available cyclopentadiene of 3:1. A yield of 1-(2-bicyclo[2·2·1]hept-5-enyl)hex-5-ene of 50 percent and a yield of 1-[2-($\Delta^2$-octahydro-1,4:5,8-dimethanonaphthyl)]hex-5-ene of 6 percent, based on dicyclopentadiene, were obtained.

What is claimed is:
1. 1 - (2 - bicyclo[2·2·1]hept - 5 - enyl)hex - 5 - ene.
2. 1 - [2 - ($\Delta^6$ - octahydro - 1,4:5,8 - dimethanonaphthyl)]hex-5-ene.

References Cited in the file of this patent

Plate et al.: Chemical Abstracts, vol. 50, col. 11257f.